(12) United States Patent
Sorokin

(10) Patent No.: US 11,541,803 B2
(45) Date of Patent: Jan. 3, 2023

(54) SHOWING A TARGET VEHICLE OPENING FORE ZONE OF AN AUTOMATED VEHICLE

(71) Applicant: Bayerische Motoren Werke Aktiengesellschaft, Munich (DE)

(72) Inventor: Lenja Sorokin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 563 days.

(21) Appl. No.: 16/516,388

(22) Filed: Jul. 19, 2019

(65) Prior Publication Data

US 2019/0337442 A1  Nov. 7, 2019

Related U.S. Application Data

(63) Continuation of application No. PCT/EP2018/051829, filed on Jan. 25, 2018.

(30) Foreign Application Priority Data

Jan. 26, 2017 (DE) .................... 10 2017 201 289.7

(51) Int. Cl.
*B60Q 1/08* (2006.01)
*B60Q 1/00* (2006.01)
(Continued)

(52) U.S. Cl.
CPC .......... *B60Q 1/085* (2013.01); *B60Q 1/0035* (2013.01); *B60Q 1/24* (2013.01); *B60Q 1/503* (2013.01);
(Continued)

(58) Field of Classification Search
CPC .......... B60Q 1/85; B60Q 1/0035; B60Q 1/24; B60Q 1/503; B60Q 2400/40;
(Continued)

(56) References Cited

U.S. PATENT DOCUMENTS 6,553,285 B1 *  4/2003  Bahmad ................ B60Q 1/503
                                                         701/1
7,175,321 B1 *  2/2007  Lopez .................... G09F 21/04
                                                         362/504
(Continued)

FOREIGN PATENT DOCUMENTS

DE   10 2013 202 072 A1   8/2014
DE   10 2013 012 891 A1   2/2015
(Continued)

OTHER PUBLICATIONS

International Search Report (PCT/ISA/210) issued in PCT Application No. PCT/EP2018/051829 dated May 2, 2018 with English translation (eight pages).
(Continued)

*Primary Examiner* — Wei (Victor) Y Chan
(74) *Attorney, Agent, or Firm* — Crowell & Moring LLP

(57) ABSTRACT

A method is provided for showing a target vehicle opening fore zone for a potential, future vehicle user (220) of an automated vehicle (200) by a control device, wherein the potential, future vehicle user of the automated vehicle is detected outside of the automated vehicle, and the automated vehicle marks the target vehicle opening fore zone for the potential, future vehicle user during the travel to the potential, future vehicle user before a stopping position (250) is reached.

13 Claims, 3 Drawing Sheets

(51) Int. Cl.
    *B60R 25/10* (2013.01)
    *B60W 60/00* (2020.01)
    *B60Q 1/24* (2006.01)
    *B60Q 1/50* (2006.01)

(52) U.S. Cl.
    CPC ... *B60R 25/1001* (2013.01); *B60W 60/00253* (2020.02); *B60Q 2400/40* (2013.01); *B60Q 2400/50* (2013.01); *B60R 2225/00* (2013.01)

(58) Field of Classification Search
    CPC ......... B60Q 2400/50; B60W 60/00253; B60R 25/1001; B60R 2225/00
    See application file for complete search history.

(56) References Cited

U.S. PATENT DOCUMENTS

| | | | | |
|---|---|---|---|---|
| 9,896,107 | B1* | 2/2018 | Huang | B60W 50/14 |
| 9,953,538 | B1* | 4/2018 | Matthiesen | B60Q 1/543 |
| 10,589,716 | B2* | 3/2020 | Sobecki | B60R 25/2054 |
| 2003/0146827 | A1* | 8/2003 | Koike | B60Q 1/50 |
| | | | | 340/436 |
| 2007/0053195 | A1* | 3/2007 | Alberti | B60Q 1/2665 |
| | | | | 362/494 |
| 2009/0013922 | A1* | 1/2009 | Lin | B60Q 1/50 |
| | | | | 116/28 R |
| 2011/0273671 | A1* | 11/2011 | Chu | B60Q 1/323 |
| | | | | 353/13 |
| 2012/0020101 | A1* | 1/2012 | Pastrick | F21S 43/237 |
| | | | | 362/494 |
| 2012/0081915 | A1* | 4/2012 | Foote | B60Q 1/22 |
| | | | | 362/494 |
| 2013/0253999 | A1* | 9/2013 | Pinkus | G06Q 30/0265 |
| | | | | 705/14.62 |
| 2015/0035685 | A1 | 2/2015 | Strickland et al. | |
| 2017/0120804 | A1* | 5/2017 | Kentley | B60Q 1/0035 |
| 2017/0203685 | A1* | 7/2017 | Hirai | B60Q 1/50 |
| 2017/0240098 | A1* | 8/2017 | Sweeney | B60Q 1/2615 |
| 2017/0249846 | A1 | 8/2017 | Ignaczak et al. | |
| 2018/0012156 | A1 | 1/2018 | Voelz et al. | |
| 2018/0039917 | A1* | 2/2018 | Buttolo | B60W 60/00253 |
| 2018/0118099 | A1* | 5/2018 | Kunii | B60Q 1/503 |
| 2019/0255902 | A1* | 8/2019 | Toyoda | B60G 17/0195 |
| 2021/0291874 | A1* | 9/2021 | Boccuccia | H04W 4/44 |

FOREIGN PATENT DOCUMENTS

| | | |
|---|---|---|
| DE | 10 2014 110 958 A1 | 4/2015 |
| DE | 10 2014 011 811 A1 | 2/2016 |
| DE | 10 2014 116 171 A1 | 5/2016 |
| DE | 10 2015 201 205 A1 | 7/2016 |
| DE | 10 2017 103 373 A1 | 8/2017 |
| JP | 2009-40236 A | 2/2009 |
| WO | WO 2015/055638 A1 | 4/2015 |

OTHER PUBLICATIONS

German-language Written Opinion (PCT/ISA/237) issued in PCT Application No. PCT/EP2018/051829 dated May 2, 2018 (five pages).
German-language Office Action issued in counterpart German Application No. 10 2017 201 289.7 dated Oct. 18, 2017 (four pages).

* cited by examiner

SHOWING A TARGET VEHICLE OPENING FORE ZONE OF AN AUTOMATED VEHICLE

CROSS REFERENCE TO RELATED APPLICATIONS

This application is a continuation of PCT International Application No. PCT/EP2018/051829, filed Jan. 25, 2018, which claims priority under 35 U.S.C. § 119 from German Patent Application No. 10 2017 201 289.7, filed Jan. 26, 2017, the entire disclosures of which are herein expressly incorporated by reference.

BACKGROUND AND SUMMARY OF THE INVENTION

The invention relates to a method and a control apparatus for displaying a target vehicle opening fore zone of an automated vehicle.

Methods by which a driver of a motor vehicle is "greeted" by the vehicle prior to getting into said vehicle are known. In the process, different lighting elements are activated, for example, said lighting elements illuminating the vehicle surroundings, in particular.

German patent document DE 10 2013 202 072 A1 describes a method for carrying out a greeting scenario by a motor vehicle, wherein the distance of the driver from the vehicle is captured. If the distance reaches, or drops below, a threshold, a lighting function that activates at least one lighting element is carried out in the process.

In the age of increasingly automated driving, situations in which an automated vehicle moves independently toward its driver or its potential, future vehicle user are conceivable.

The term "automated driving" can be understood to mean driving with automated longitudinal or lateral guidance or autonomous driving with automated longitudinal and lateral guidance. The phrase "automated driving" comprises automated driving with any degree of automation, in particular assisted, partly automated, highly automated, fully automated or driverless driving. In the case of assisted driving, the driver permanently implements the longitudinal or lateral guidance while the system assumes the respective other function. In the case of partly automated driving, the system assumes the longitudinal and lateral guidance, with the driver having to permanently monitor the system. In the case of highly automated driving, the system assumes the longitudinal and lateral guidance, without the driver having to permanently monitor the system; however, the driver must be able to assume the vehicle guidance within a certain amount of time. In the case of fully automated driving, the system can automatically handle driving in all situations for a specific application; no driver is required anymore for this application. In the case of driverless driving, the system can automatically handle all situations during the entire journey; in general, a driver is no longer necessary.

In the aforementioned novel situations, conventional methods for carrying out a greeting scenario offer the potential, future vehicle user less convenience than in stationary situations, in which a driver moves toward a standing vehicle.

It is an object of the invention to specify an improved greeting scenario for an automated vehicle.

The object is achieved by the features of the independent patent claims. Advantageous embodiments are described in the dependent claims. Reference is made to the fact that additional features of a patent claim that depends on an independent patent claim can, without the features of the independent patent claim or only in combination with a subset of the features of the independent patent claim, form a distinctive invention that is independent of the combination of all features of the independent patent claim, which independent invention can be made the subject matter of an independent claim, a divisional application or a subsequent application. This applies equally to technical teaching described in the description, which can form an invention that is independent of the features of the independent patent claims.

A first aspect of the invention relates to a method for displaying a target vehicle opening fore zone for a potential, future vehicle user of an automated vehicle by means of a controller.

The target vehicle opening fore zone may be a spatial region through which the potential, future vehicle user must pass in order to interact with the vehicle. By way of example, the target vehicle opening fore zone can be the area next to the vehicle that is adjacent to at least one door of the vehicle. However, it can also be the area next to which the door of a still approaching vehicle will come to rest.

In particular, the meaning of the target vehicle opening fore zone can be that of an entry region or that of a loading region.

By way of example, the potential, future vehicle user can be the future driver of the vehicle. Alternatively, however, the potential, future vehicle user can also only place an object or an animal in the vehicle or interact with the vehicle on the behest of, or for assisting, a third person; by way of example, the potential, future vehicle user can assist a passenger with getting in the vehicle.

Alternatively, it is also conceivable for an automated vehicle to be able to evaluate the occupancy of the seats in its interior in order to determine the target vehicle opening fore zone in such a way that the latter only adjoins the doors of the vehicle behind which an unoccupied seat is situated.

The potential, future vehicle user of the automated vehicle is already identified outside of the automated vehicle during the approach, i.e., before the stopping position is reached.

Here, this identification may comprise various aspects. By way of example, it is possible to capture the spatial position of the potential, future vehicle user. As an alternative or in addition thereto, the identity of the future, potential vehicle user may also be determined.

As an alternative or in addition thereto, it is also possible to capture a desire to enter and/or a probability of acceptance of a potential mobility offer. The probability of acceptance can be established here by evaluating at least one of the following criteria relating to the potential, future vehicle user: position, route, reason for movement, urgency.

The automated vehicle indicates the target vehicle opening fore zone to the potential, future vehicle user during the journey to the potential, future vehicle user before reaching a stopping position.

A stopping position of the automated vehicle in this case describes a spatial location at which the automated vehicle will come to rest. Here, for example, this may be the location where the center of gravity of the vehicle is situated after stopping. Alternatively, this may also be a stop line, for example for the vehicle front, or a stopping area for the entire vehicle.

By way of example, the target vehicle opening fore zone can be indicated optically by means of an output unit of the vehicle. In particular, the indication can be implemented by means of at least one lighting means by virtue of at least one light source being aligned onto the target vehicle opening fore zone and/or being activated. The light source can be a headlamp implemented using any technology, or else a projector or a display.

As an alternative or in addition thereto, the indication can also be implemented by means of an appliance carried by the potential, future vehicle user, in particular by way of an augmented reality representation.

Moreover, the indication can also be implemented by an output unit of the infrastructure, for example by projectors, displays or lighting means integrated into the infrastructure.

In an advantageous embodiment of the invention, the potential, future vehicle user is identified by at least one sensor of the automated vehicle.

A multiplicity of different sensors can be used to this end, for example optical sensors such as cameras. By way of example, a person can be identified, and the gestures performed by the identified person can be determined, by means of a camera. Here, known image processing methods can identify whether a person is beckoning the automated vehicle toward them or said person wishes to make the automated vehicle aware of them by way of a raised arm.

Moreover, it is alternatively or additionally also possible for facial recognition to be carried out by means of a camera and consequently possible for the potential, future vehicle user to be identified, provided that an image showing the face of the potential, future vehicle user was saved in advance.

Acoustic sensors may also be used as an alternative, or in addition, to optical sensors. By way of example, a potential, future vehicle user can make the automated vehicle aware of them by a loud call. Here, defined commands may be provided.

As an alternative or in addition thereto, the sensor of the automated vehicle can also accept signals of a mobile terminal in order to identify the future, potential vehicle user, wherein identification codes may be interchanged.

In a further advantageous embodiment of the invention, information items from an electronic appliance of the potential, future vehicle user are received by means of the controller. The potential, future vehicle user is identified by means of the received information items.

By way of example, the information items can be received by way of a sensor of the vehicle, for example, a mobile radio receiver or a receiver for wireless near field communication.

The electronic appliance of the potential, future vehicle user can be a mobile terminal such as a cellular telephone, a smart watch, smart textiles or smart glasses, for example. However, this can also be any electronic appliance by means of which the potential, future vehicle user can be identified, and which can determine properties such as the mobility requirements of the potential, future vehicle user, for example.

The information items received by the electronic appliance can be used, for example, to identify the potential, future vehicle user. To this end, a digital profile of the potential, future vehicle user, for instance, can be transferred, or else a cryptographic signature. If a received, digital profile comprises an image of the potential, future vehicle user, the latter can also be used for a camera-based person identification.

As an alternative or in addition thereto, at least one information item for identifying the spatial position of the potential, future vehicle user can also be transferred, such as absolute or relative spatial coordinates, for example.

In a further advantageous embodiment of the invention, an information item is received by means of the controller and the stopping position of the automated vehicle is determined by means of the received information item. The information item can be, in particular, a spatial information item and/or an information item that is characteristic for the weather.

As an alternative or in addition thereto, the information item can also be, in particular, at least one feature of a digital map, which is relevant to the entry of the potential, future vehicle user into the automated vehicle.

By way of example, this may relate to an information item that characterizes the condition of the ground. For instance, if it is expected that the potential, future vehicle user must walk through a puddle when entering the automated vehicle on account of the condition of the ground, a different stopping position can be chosen by means of the information item.

As an alternative or in addition thereto, the information item can also be an information item about the use of a location. By way of example, a location in front of a hotel entrance may be unsuitable as a stopping position since very high volumes of person and vehicle traffic can be expected at this location. The automated vehicle can select a different stopping position by means of the information item.

As an alternative or in addition thereto, the spatial information item can also be a control information item of a vehicle fleet control system, for example future stopping points of the other vehicles in the vehicle fleet.

In a further advantageous embodiment of the invention, the future stopping position of the automated vehicle and/or the display of the target vehicle opening fore zone are adapted to the determined, actual movement of the potential, future vehicle user should it be determined that the potential, future vehicle user is not moving in the direction of the display of the target vehicle opening fore zone for the future stopping position of the automated vehicle.

In the process, the potential, future vehicle user may, e.g., approach a desired vehicle opening fore zone which, for instance, is more easily accessible to them than the target vehicle opening fore zone intended by the automated vehicle. In this case, the automated vehicle must first determine a new stopping position and adapt its movement plan in such a way that it can reach this stopping position. Second, the automated vehicle must adapt the display of the target vehicle opening fore zone in such a way that the latter substantially corresponds to the desired vehicle opening fore zone of the potential, future vehicle user. When adapting the display of the target vehicle opening fore zone, the display may either remain activated and consequently "migrate" or else the display can be faded out at the first, original position and simply appear at the new position.

As an alternative or in addition thereto, the potential, future vehicle user can let the automated vehicle know by way of deliberate, spatial positioning in the vicinity of the display of the target vehicle opening fore zone that they do not wish to directly enter the vehicle and instead wish to initially open a hatch, e.g., the rear hatch, of the automated vehicle. To this end, for example, they can position themselves behind the display of the target vehicle opening fore zone and parallel to the lane, counter to the direction of travel. Here, the spatial positioning of the potential, future vehicle user can be identified by the sensor system of the vehicle or by a mobile terminal carried by the potential, future vehicle user, for example.

In this case, the automated vehicle may maintain the display of the target vehicle opening fore zone but adapt its stopping position in such a way that the hatch to be opened by the potential, future vehicle user is situated as close as possible to the spatial position of the potential, future vehicle user after the automated vehicle has come to rest.

In a further advantageous embodiment of the invention, the display of the target vehicle opening fore zone comprises at least one element that is determined depending on a property characteristic to the automated motor vehicle.

An element of the target vehicle opening fore zone can be a portion of the display of the target vehicle opening fore zone, in particular an illuminated area portion, wherein the entire display of the target vehicle opening fore zone may also be considered to be an element. A plurality of elements may have any spatial relationship to one another and may, for example, adjoin one another or overlap one another.

By way of example, the element that is determined depending on a property characteristic to the automated motor vehicle can be, for example, a symbol, a logo, writing or any combination thereof.

A characteristic property of the automated motor vehicle can represent the manufacturer or the model name thereof, for example. However, this may also relate to a property of the drive of the automated vehicle, e.g., the energy source (e.g., gasoline, diesel, battery, hydrogen) or the power thereof. Moreover, the characteristic property may also describe the utility of the motor vehicle, for example the number of seats.

In a further advantageous embodiment of the invention, the display of the target vehicle opening fore zone comprises at least one element that facilitates an assignment of the display of the target vehicle opening fore zone to the potential, future vehicle user.

By way of example, this assignment can be established by a spatial element, for instance a symbol pointing in the direction of the potential, future vehicle user. As an alternative or in addition thereto, this assignment can also be established by a textual element, in which, for instance, the name of the potential, future vehicle user or a reservation number assigned thereto is displayed.

In a further advantageous embodiment of the invention, the target vehicle opening fore zone for the potential, future vehicle user is the path from the current, spatial position of the vehicle user to the calculated, future stopping position of the automated vehicle.

By way of example, if the target vehicle opening fore zone is displayed using a headlamp in this embodiment, the path of the potential, future vehicle user can be illuminated in the entirety thereof.

In a further advantageous embodiment of the invention, the display of the target vehicle opening fore zone comprises at least one element that facilitates an interaction of the potential, future vehicle user with the automated vehicle.

By way of example, this interaction can be implemented by virtue of the automated vehicle monitoring and evaluating the behavior of the potential, future vehicle user. In particular, it is possible to evaluate a change in the behavior of the potential, future vehicle user depending on the display of the interactive element.

By way of example, the automated vehicle can monitor the display of the interactive element and, at the same time, the potential, future vehicle user by means of an optical sensor. Here, the interactive element may represent a "button," for example, which the potential, future vehicle user can "actuate" with their foot.

In a further advantageous embodiment, the display of the target vehicle opening fore zone comprises at least one first element that describes an offer for a journey with the automated vehicle. By way of example, this offer may comprise a destination and a fare, which can be displayed in textual or symbolic fashion. A further option for an offer of the automated vehicle lies in an offer for a transportation task. By way of example, the automated vehicle may offer picking up a third party and bringing them to the potential, future vehicle user.

In order to increase the duration during which the offer is visible to the potential, future vehicle user, the automated vehicle may reduce its speed for as long as the potential, future vehicle user is within the range of the actuator that is used to display the target vehicle opening fore zone. If the offer is ignored over a relatively long time interval, it can also be withdrawn again, for example.

The display of the target vehicle opening fore zone comprises at least one second, interactive element, by means of which the potential, future vehicle user can accept the offer. Here, the second, interactive element may be an element that differs from the first element. However, this may also relate to the same element.

If the offer is accepted by the potential, future vehicle user, the automated vehicle can adapt its movement plan, for example, depending on the offer in order to fulfill the offer.

A second aspect of the invention relates to a control apparatus for displaying a target vehicle opening fore zone for a potential, future vehicle user of an automated vehicle comprising at least one sensor for identifying the potential, future vehicle user of the automated vehicle outside of the automated vehicle, a vehicle opening fore zone display module for indicating the target vehicle opening fore zone for the potential, future vehicle user during the journey to the potential, future vehicle user before the automated vehicle reaches a stopping position, and a controller, by means of which the signals of the sensor are evaluable and by means of which the vehicle opening fore zone display module is actuatable.

The statements made above in relation to the method according to the invention in accordance with the first aspect of the invention also apply accordingly to the control apparatus according to the invention in accordance with the second aspect of the invention. Advantageous exemplary embodiments of the control apparatus according to the invention, not explicitly described either here or in the patent claims, correspond to the advantageous exemplary embodiments of the method according to the invention described above or in the patent claims.

The invention will be described below on the basis of an exemplary embodiment with the aid of the attached drawing. In the latter:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
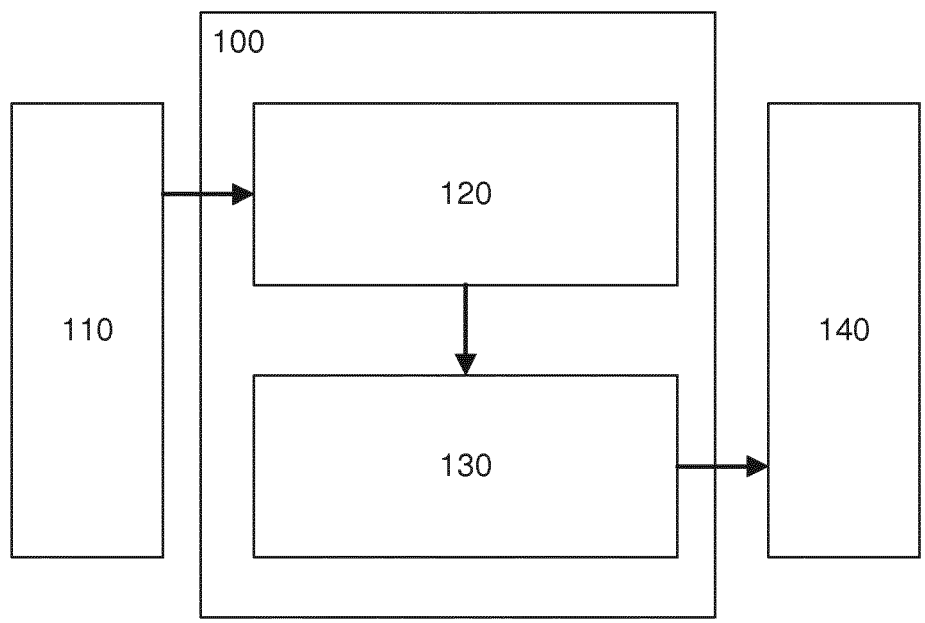
FIG. 1A shows components of an exemplary control apparatus according to the invention.

FIG. 1A shows components of an exemplary control apparatus according to the invention. Here, the control apparatus comprises at least one sensor 110, which may be a camera, for example. The sensor 110 communicates with a vehicle user identification module 120 that is integrated in a controller 100 and configured to identify the potential, future vehicle user in the sensor data of the sensor 110. Here, this identification can comprise both the determination of the spatial position of the potential, future vehicle user and their identification.

The passenger identification module 120 communicates in turn with a vehicle opening fore zone display module 130. This vehicle opening fore zone display module 130 is configured to determine a suitable display form and type of the target vehicle opening fore zone. Then, the target vehicle opening fore zone is indicated by means of at least one actuator 140. By way of example, the actuator 140 can be an actuator already present in conventional vehicles, for instance a headlamp. However, a novel actuator may also be used to this end, such as a light projector, for example.

Figure 1B:
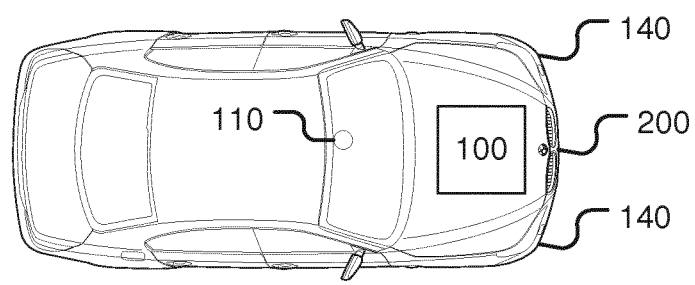
FIG. 1B shows an exemplary motor vehicle with an integrated control apparatus according to the invention.

FIG. 1B shows a motor vehicle 200 with an integrated control apparatus according to the invention. The control apparatus comprises a sensor 110, for example a camera, the data of which a controller 100 accesses for the purposes of identifying the potential, future vehicle user. After calculating the target vehicle opening fore zone, the controller 100 actuates the headlamps 140 of the vehicle 200 in order to illuminate the target vehicle opening fore zone.

Figure 2A:
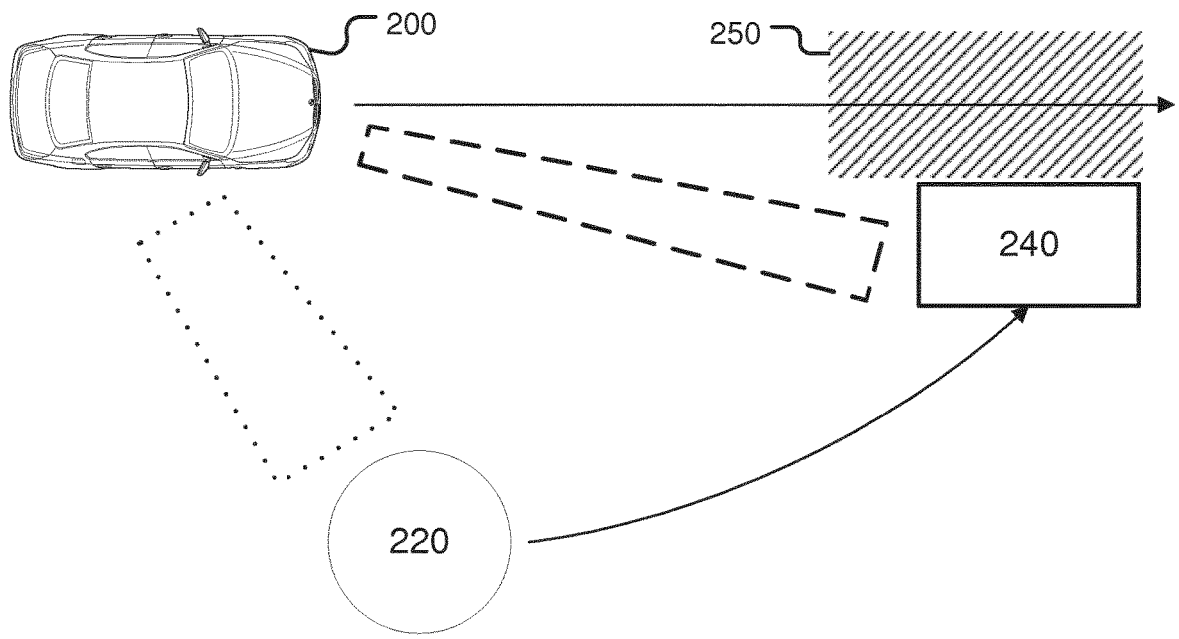
FIG. 2A shows a first instant during an exemplary embodiment of the method according to the invention.

FIG. 2A shows an exemplary embodiment of the method according to the invention at a first instant. Here, by means of its sensor system 110 and its vehicle user identification module 120, the automated motor vehicle 200 identifies the potential, future vehicle user 220. Said vehicle user may have booked a journey with the automated vehicle 200 via an online platform, for example.

After identifying the future vehicle user 220, the automated vehicle 200, depending on its envisaged stopping position 250, uses its vehicle opening fore zone display module 130 to determine a suitable display type for indicating the target vehicle opening fore zone 240 to the potential, future vehicle user 220. The automated vehicle indicates the target vehicle opening fore zone 240 to the potential, future vehicle user 220 with the aid of an actuator 140, for example a headlamp.

Figure 2B:
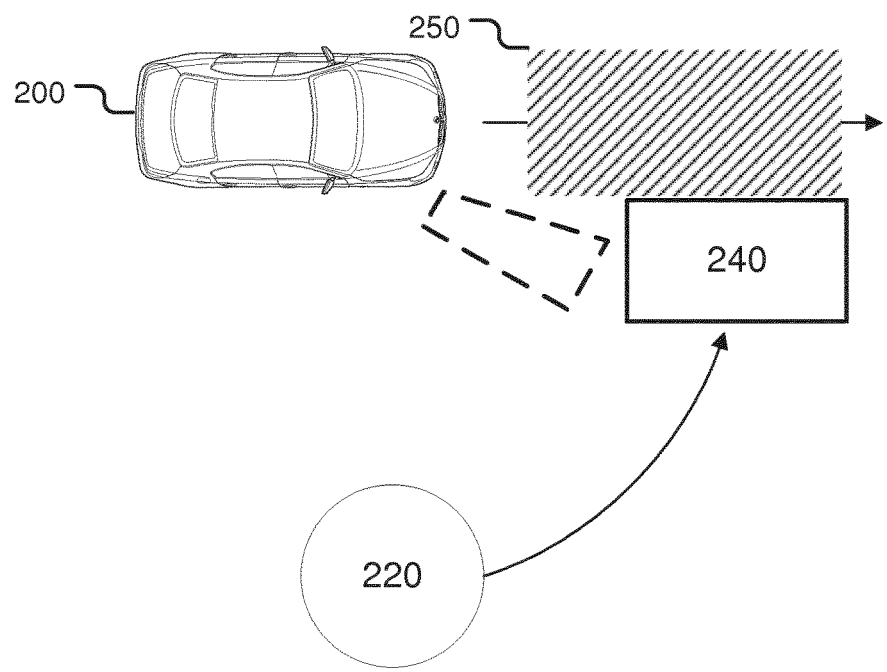
FIG. 2B shows a second instant during the exemplary embodiment of the method according to the invention.

FIG. 2B shows a second instant during the exemplary embodiment of the method according to the invention. Illustrated here is that the automated vehicle 200 has in the meantime come closer to the envisaged stopping position 250 and the target vehicle opening fore zone 240. The potential, future vehicle user 220 has also approached the target vehicle opening fore zone 240. The indication of the target vehicle opening fore zone 240 is continuously adapted to the movement of the automated vehicle 200 by the vehicle opening fore zone display module 130 in order to obtain a stationary display of the target vehicle opening fore zone 240.

Figure 3:
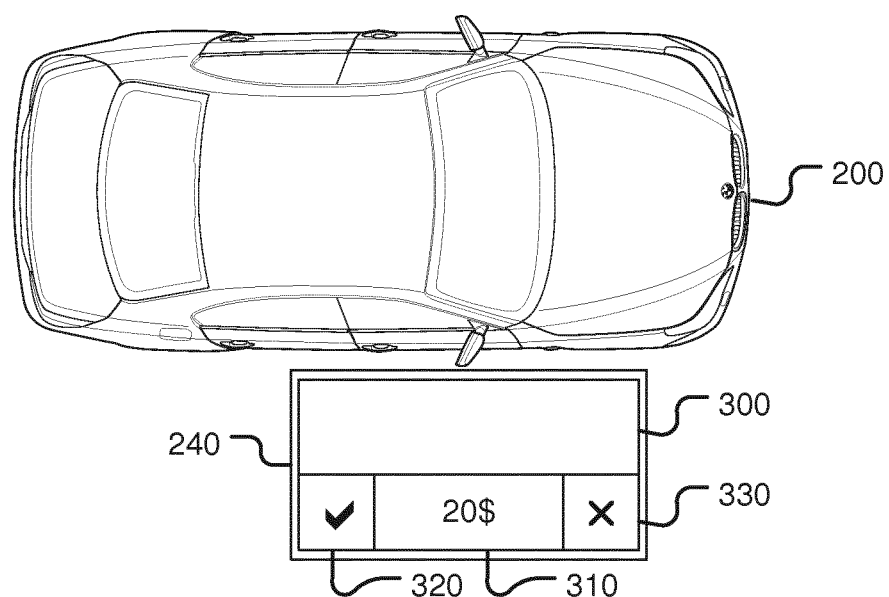
FIG. 3 shows a display of a target vehicle opening fore zone, according to the invention, of a motor vehicle, consisting of a plurality of elements.

FIG. 3 shows a display according to the invention of a target vehicle opening fore zone 240 of a motor vehicle 200, consisting of a plurality of elements 300, 310, 320, 330. Here, the target vehicle opening fore zone 240 can be represented by light projection, for example.

A first element 300 of the target vehicle opening fore zone 240 serves to illuminate the ground at the position at which the vehicle doors on one vehicle side will come to rest. In addition to the function for the potential, future vehicle user 220 of informing the latter about the spatial position of the vehicle opening fore zone 240, this may also make obstacles that may be present, such as puddles, for example, more visible.

A second element 310 displays an offer of the automated vehicle 200 to the potential, future vehicle user 220. In this exemplary case, the offer may be that, for instance, the automated vehicle 200 could transport the potential, future vehicle user 220 for a fee of $20.

Moreover, the display of the target vehicle opening fore zone 240 still comprises a third, interactive element 320 and a fourth, interactive element 330.

The potential, future vehicle user 220 can accept the offer of the automated vehicle 200 by means of the third, interactive element 320. This volition can be indicated, for example, by virtue of stepping on the tick illustrated in the third, interactive element 320 with their foot.

The potential, future vehicle user 220 can decline the offer of the automated vehicle 200 by means of the fourth, interactive element 330. The fourth, interactive element 330 can be operated in analogous fashion to the operation of the third, interactive element 320 in this case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying a target vehicle opening fore zone, which indicates an entry region or a loading zone, for a potential future vehicle user of an automated vehicle by a controller, the method comprising: identifying the potential future vehicle user located outside of the automated vehicle; and indicating to the potential future vehicle user the target vehicle opening fore zone by at least one actuator of the automated vehicle that is actuatable by the controller during a journey to the potential future vehicle user before a stopping position of the automated vehicle is reached and after the potential future vehicle user located outside of the automated vehicle is identified; wherein a future stopping position of the automated vehicle and a display of the target vehicle opening fore zone are adapted to an actual movement of the potential future vehicle user in a case in which the potential future vehicle user is not moving in a direction of the display of the target vehicle opening fore zone for the future stopping position of the automated vehicle; and
   wherein a display of the target vehicle opening fore zone comprises at least one element that facilitates an interaction of the potential future vehicle user with the automated vehicle;
   wherein the display of the target vehicle opening fore zone comprises at least one first element that describes an offer for a journey with the automated vehicle; the display of the target vehicle opening fore zone comprises at least one second, interactive element, through which the potential future vehicle user can accept the offer; and the automated vehicle modifies a movement plan depending on the offer in a case in which the offer is accepted by the potential future vehicle user.

2. The method as claimed in claim 1, wherein the potential future vehicle user is identified by at least one sensor of the automated vehicle.

3. The method as claimed in claim 1, wherein information items from an electronic appliance of the potential future vehicle user are received by the controller directly or indirectly via a server and the potential future vehicle user is identified based on the received information items.

4. The method as claimed in claim 1, wherein an information item is received by the controller and the stopping position of the automated vehicle is determined based on the received information item.

5. The method as claimed in claim 1, wherein a display of the target vehicle opening fore zone comprises at least one element that facilitates an assignment of the display of the target vehicle opening fore zone to the potential future vehicle user.

6. The method as claimed in claim 1, wherein the target vehicle opening fore zone for the potential future vehicle user is a path from a current spatial position of the potential future vehicle user to a future stopping position of the automated vehicle.

7. The method as claimed in claim 2, wherein information items from an electronic appliance of the potential future vehicle user are received by the controller directly or indirectly via a server and the potential future vehicle user is identified based on the received information items.

8. The method as claimed in claim 2, wherein an information item is received by the controller and the stopping position of the automated vehicle is determined based on the received information item.

9. The method as claimed in claim 3, wherein an information item is received by the controller and the stopping position of the automated vehicle is determined based on the received information item.

10. The method as claimed in claim 2, wherein a display of the target vehicle opening fore zone comprises at least one element that facilitates an assignment of the display of the target vehicle opening fore zone to the potential future vehicle user.

11. The method as claimed in claim 3, wherein a display of the target vehicle opening fore zone comprises at least one element that facilitates an assignment of the display of the target vehicle opening fore zone to the potential future vehicle user.

12. A control apparatus for displaying a target vehicle opening fore zone, which indicates an entry region or a loading zone, for a potential future vehicle user of an automated vehicle comprising at least one sensor for identifying the potential future vehicle user of the automated vehicle outside of the automated vehicle, a vehicle opening fore zone display module for indicating the target vehicle opening fore zone for the potential future vehicle user during the journey to the potential future vehicle user before the automated vehicle reaches a stopping position, and a controller, by means of which the signals of the sensor are evaluable and by means of which the vehicle opening fore zone display module is actuatable; wherein a future stopping position of the automated vehicle and a display of the target vehicle opening fore zone are adapted to an actual movement of the potential future vehicle user in a case in which the potential future vehicle user is not moving in a direction of the display of the target vehicle opening fore zone for the future stopping position of the automated vehicle;

wherein a display of the target vehicle opening fore zone comprises at least one element that facilitates an interaction of the potential future vehicle user with the automated vehicle;

wherein the display of the target vehicle opening fore zone comprises at least one first element that describes an offer for a journey with the automated vehicle; the display of the target vehicle opening fore zone comprises at least one second, interactive element, through which the potential future vehicle user can accept the offer; and the automated vehicle modifies a movement plan depending on the offer in a case in which the offer is accepted by the potential future vehicle user.

13. The method as claimed in claim 1, further comprising:

identifying gestures performed by the potential future vehicle user; and determining whether the potential future vehicle user is beckoning the automated vehicle toward the potential future vehicle user based on the gestures.

* * * * *